United States Patent
Chamberlain et al.

(10) Patent No.: US 9,523,983 B2
(45) Date of Patent: Dec. 20, 2016

(54) AUTOMATED AMBULATORY REHABILITATION DEVICE

(71) Applicants: Peter Chamberlain, Cambridge, MA (US); Nicholas MacKinnon, Sherwood, OR (US); Sean O'Rourke, Portland, OR (US)

(72) Inventors: Peter Chamberlain, Cambridge, MA (US); Nicholas MacKinnon, Sherwood, OR (US); Sean O'Rourke, Portland, OR (US)

( * ) Notice: Subject to any disclaimer, the term of this patent is extended or adjusted under 35 U.S.C. 154(b) by 0 days.

(21) Appl. No.: 14/682,016

(22) Filed: Apr. 8, 2015

(65) Prior Publication Data

US 2016/0299502 A1    Oct. 13, 2016

(51) Int. Cl.
*G05D 1/02* (2006.01)
*G05D 1/00* (2006.01)
*A61H 3/04* (2006.01)

(52) U.S. Cl.
CPC .............. *G05D 1/0055* (2013.01); *A61H 3/04* (2013.01); *G05D 1/0088* (2013.01); *G05D 1/0242* (2013.01); *G05D 1/0255* (2013.01); *A61H 2003/043* (2013.01); *A61H 2003/046* (2013.01)

(58) Field of Classification Search
CPC ...... A61H 3/04; A61H 3/06; A61H 2003/046; A61H 2003/043; A61H 2201/5071; A61H 2201/0176; A61H 2201/5092; A61H 2201/1616; A61H 2201/163; B62B 5/06; B62B 5/0026; B62B 5/0033
USPC ........... 701/22, 23; 135/67, 72, 85; 180/19.3
See application file for complete search history.

(56) References Cited

U.S. PATENT DOCUMENTS

| | | | |
|---|---|---|---|
| 5,636,651 A | 6/1997 | Einbinder | |
| 6,536,544 B1 * | 3/2003 | Egawa | A61H 3/04 180/19.3 |
| 6,708,705 B2 | 3/2004 | Nasco, Sr. | |
| 7,044,361 B2 | 5/2006 | March | |
| 7,708,120 B2 | 5/2010 | Einbinder | |
| 7,901,368 B2 | 3/2011 | Flaherty | |
| 8,453,662 B2 | 6/2013 | Trout | |
| 2011/0166753 A1 * | 7/2011 | Yu | A61H 3/04 701/51 |
| 2012/0242501 A1 * | 9/2012 | Tran | A61B 5/0024 340/870.02 |
| 2015/0125832 A1 * | 5/2015 | Tran | G09B 5/00 434/127 |

FOREIGN PATENT DOCUMENTS

| | | |
|---|---|---|
| CN | 203468972 | 3/2014 |
| DE | 202012011634 | 2/2013 |

OTHER PUBLICATIONS

Sabatini et al., IEEE/RSJ Intl. Conference on Intelligent Robots and Systems, "A Mobility Aid for the Support to Walking and Object Transportation of People with Motor Impairments," Oct. 2002.

(Continued)

*Primary Examiner* — Marthe Marc-Coleman
(74) *Attorney, Agent, or Firm* — Schwabe, Williamson & Wyatt, P.C.

(57) ABSTRACT

Disclosed herein is a mobility aid which uses one or more sensors, processors, motors, and drive wheels to maintain a distance between the mobility aid and a user which conforms to preset parameters as the user walks without touching the walker.

12 Claims, 3 Drawing Sheets

(56) References Cited

OTHER PUBLICATIONS

Merlet, J-P., "Preliminary Design of ANG, a Low-Cost Automated Walker for Elderly," Jun. 17, 2014.
Martins et al., "Assistive Mobility Devices focusing on Smart Walkers: Classification and Review," Document created Nov. 22, 2011.
Hirata et al., Passive-type Intelligent Walker Controlled Based on Caster-like Dynamics, Rehabilitation Robotics, pp. 648, Aug. 2007.
Delahoz et al., "Survey on Fall Detection and Fall Prevention Using Wearable and External Sensors," Sensors 2014, 19806-19842, Oct. 22, 2014.
Jiang et al., IEEE International Conference on Mechatronics and Automation, "User Directional Intention Recognition of an Omni-directional WAlking Support Walker," Aug. 2011.

\* cited by examiner

AUTOMATED AMBULATORY REHABILITATION DEVICE

BACKGROUND OF THE INVENTION

The present invention is in the field of medical devices. More specifically, the present invention is in the technical field of portability or mobility aides, particularly mobility aides which facilitate the transition between dependence on a mobility aide and independent walking.

Conventional walkers (either with legs or wheels) are used by weak but ambulatory people. Users of this type of portability aid walk under their own power, but rely on their walkers for assistance. These aids assist users in ambulatory rehabilitation. For example, a patient who is recovering from illness or injury and regaining the ability to walk may use a walker for support and balance while regaining the strength and confidence necessary to walk independently.

BRIEF SUMMARY OF THE INVENTION

Disclosed herein is a mobility aid comprising: a frame, at least one handle, a motor, and a plurality of wheels; a proximity sensor to generate data indicative of the proximity of said mobility aid to a user; circuitry coupled with said proximity sensor to determine whether said data generated by said proximity sensor indicates that said mobility aid is within a given distance from a user of said mobility aid; a force sensor coupled with said at least one handle to determine whether said user is in physical contact with said at least one handle; circuitry coupled with said force sensor and at least one of said plurality of wheels, wherein said circuitry immobilizes said wheel when said user is in physical contact with said at least one handle; and said circuitry coupled with said proximity sensor is also coupled with said motor, said motor is coupled with at least one of said plurality of wheels, and said circuitry causes said motor to alter the movement of said wheel in response to data from said proximity sensor such that said mobility aid is adapted to move in order to maintain a position proximate to said user when said user is in motion and is not in physical contact with said mobility aid.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION OF EMBODIMENTS

Figure 1:
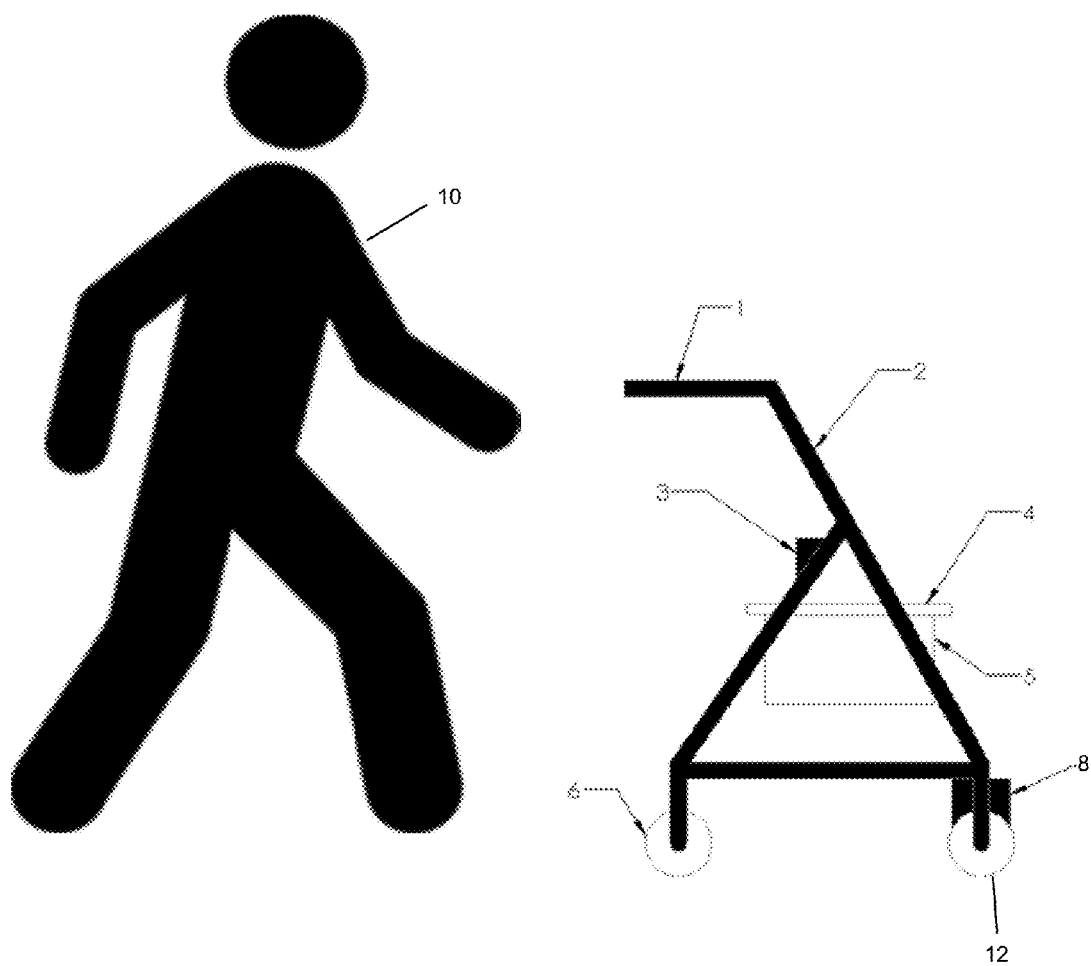
FIG. 1 is a side view of one embodiment of a device in accordance with the disclosure herein and a user.

In a rehabilitative process, a patient may be prescribed a mobility aid such as a walker to use during a phase of recovery with the expectation that as he or she gains strength, use of the walker will taper until it can be discontinued. However, walkers need to be transported by the user as they are being used. Users of walkers must push them ahead as they walk, and therefore must maintain contact with them at all times even if they are only sporadically needed for support or balance. An individual who only occasionally needs the support of a walker must therefore keep her hands on her walker even when she does not need it in order to have it available to her if or when she loses her balance or falls. Additionally, walkers provide support when users exert force on them in a downward or forward direction, typically when leaning on them. Users may habitually lean on their walkers, which frequently induce them to bend forward or otherwise practice poor posture when moving. Walkers can be habit-forming, and can create dependency in their users.

Because even patients who only need occasional support from a walker must either abandon their walkers entirely or push their walkers in front of them and thus maintain contact with their walkers at all times, they have limited opportunity to learn to walk without their walkers. Thus, a patient who is regaining the ability to walk after illness or injury may learn how to walk with the aid of the walker, but may not gain the confidence to abandon the walker, and thus will have limited opportunity to learn to walk without it. For many, the transition from using a mobility aid such as a walker to walking independently never takes place. They may become dependent on their mobility aids. Long-term dependency on walkers and other aids has been shown to negatively impact the health of the users.

Technical advancements in the field of walker design have employed motors and sensor systems to mitigate other limitations of walkers, but the tendency of walkers to create dependency remains largely unaddressed.

For example, many users of walkers lack the strength to effectively move their walkers. In order to address this problem, first wheeled walkers and then motorized walkers have been developed which can move themselves while users hold on to their handles. However, because those walkers can move independently of a user who is too weak to control them, they can create additional risks to users. For example, they may roll away from a user if the user falls or moves too slowly. For this reason, so-called smart walkers have been developed which collect information from users via one or more sensors. Such walkers may automatically stop if a user lets go of its handles or moderate movement so that a user can lean on the walker for support while walking at his or her own pace without needing to move the walker. Conventional smart walkers are designed to make it easier for people to depend on their walkers. They are not intended to provide users with the opportunity to learn to walk without the walker. They are not intended to transition users from dependence on a mobility aid to independent walking.

Similarly, many wheeled walkers are equipped with brakes so that a user can permit the wheels to turn when moving the walker and stop the walker's movement when the user wants to stop. So-called smart versions of these walkers are designed to detect the difference between a user who wants the walker's wheels to turn and a user who wants the walker's wheels to lock. These walkers are also not intended to facilitate the transition of a user from dependency on an aid to independent ambulation.

What is needed is a transitional rehabilitative mobility aid which will provide a patient with support and balance when needed but provide a patient with an opportunity to gain the confidence and strength necessary to safely regain the ability to walk independently.

In the following detailed description, reference is made to the accompanying drawings that form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense.

Various operations may be described as multiple discrete actions or operations in turn, in a manner that is most helpful in understanding the disclosed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C).

The description uses the phrases "in an embodiment," or "in embodiments," which may each refer to one or more of the same or different embodiments. Furthermore, the terms "comprising," "including," "having," and the like, as used with respect to embodiments of the present disclosure, are synonymous. As used herein, the phrase "coupled" may mean that two or more elements are in direct physical or electrical contact, or that two or more elements are not in direct contact with each other, but yet still cooperate or interact with each other (e.g., via one or more intermediate elements, which may perform their own transformations or have their own effects). For example, two elements may be coupled to each other when both elements communicate with a common element (e.g., a memory device). As used herein, the term "logic" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable components that provide the described functionality. As used herein, a signal may be "received" by a component if it is generated externally or internally to that component, and acknowledged and/or processed by that component.

Disclosed herein is a mobility aid that accommodates a greater level of user independence in order to facilitate the transition between use of a walking aid and independent walking. The device allows the user to walk independently without touching the device while the device automatically maintains a position proximate to and therefore readily available to the user. The device maintains a position in front of the user through the use of one or more sensors which track the user's motion and a motor which causes the walker to automatically move in response to data generated by the sensor. If the user at any point feels uncomfortable, loses his or her balance, or starts to fall, the device will be near the user and available to provide support. The patient can walk independently, with a posture unaffected by the walker, and still have ready access to support if needed. Thus, the user does not have to forgo the safety of an available mobility aid in order to practice walking without it.

In some embodiments, if the user grabs or touches the handles of the walker, the wheels automatically lock or the walker is otherwise automatically immobilized so that the walker can present a stable means of support. When the user regains his or her balance and is ready to continue walking, he or she releases the handles, causing the wheels to unlock or otherwise enabling the walker to resume its movement in response to the user's movement.

Referring now to a first embodiment, in FIG. 1 a walker in accordance with the disclosure herein may include handles 1, a frame 2, a sensor unit 3, optional seat 4, optional storage area 5, wheels 6, and a driving mechanism 8 for a single drive wheel 12 or multiple drive wheels. The sensor unit 3 is positioned in such a way as to measure the proximity of the user 10 from the sensor unit 3 and provide input to the driving mechanism 8. One or more handles 1 can feature external or internal force-sensing devices. The driving mechanism 8 for the wheel/s features one or more motors that move the device.

Sensor unit 3 may, by way of example, be an ultrasonic, infrared, or laser proximity sensor. In some embodiments, the sensor emits light or sound and then measures the time required for the light or sound to bounce off of the user 10 and return to the sensor 3. The sensor 3 determines the proximity of the sensor 3 to the user 10 based on this time measurement.

The sensor 3 is coupled to a processor which is in turn coupled to a drive mechanism 8 which is itself coupled to one or more drive wheels 12. Logic utilized by the processor determines whether the sensor and therefore walker is within preset distance parameters from a user, and may also determine the rate of movement of a user, and is adapted to modulate the action of drive mechanism 8 and thereby the drive wheel 12. Drive mechanism 8 causes the drive wheels 12 to turn which in turn causes the walker to move. The sensor collects distance data on a continual or frequent basis so that the processor, drive mechanism, and drive wheels can change the walker's speed in response to changes in user position, behavior, or speed.

Figure 2:
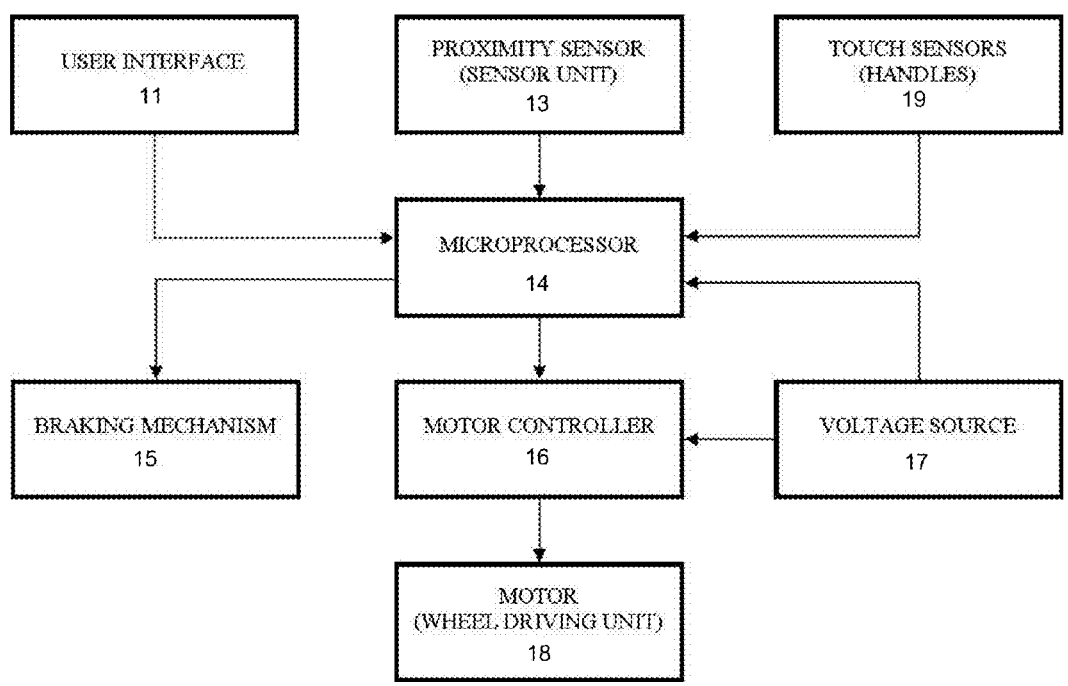
FIG. 2 is a block diagram of the operation of a device in accordance with one embodiment herein.

Referring to FIG. 2, in one exemplary embodiment, the data from the proximity sensor 13 is input into the microprocessor 14. Using logic derived from that data, the microprocessor 14 instructs the motor controller 16 to supply the appropriate voltage from the voltage source 17 to the motor or wheel driving unit 18. The user interface 11 input to the microprocessor 14 can include an on/off switch for the entire device, a setting for parameters for distance between the user and the present device, or sensitivity settings for the force sensors 19. The handle force sensors 19 are in place to alert the device of the user's need to use the walker for support. If the user grabs the handles, sensor readings are sent to microprocessor 14, which utilizes logic to determine that walker should be immobilized. The braking mechanism 15 is triggered by the microprocessor 14 in order to immobilize the walker. The braking mechanism 15 may be enclosed within the drive mechanism or may be a separate component or mechanism.

Figure 3A:
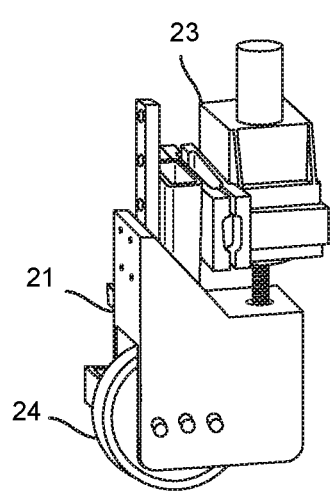
FIG. 3a is a perspective view of one embodiment of a device in accordance with the disclosure herein.
Figure 3B:
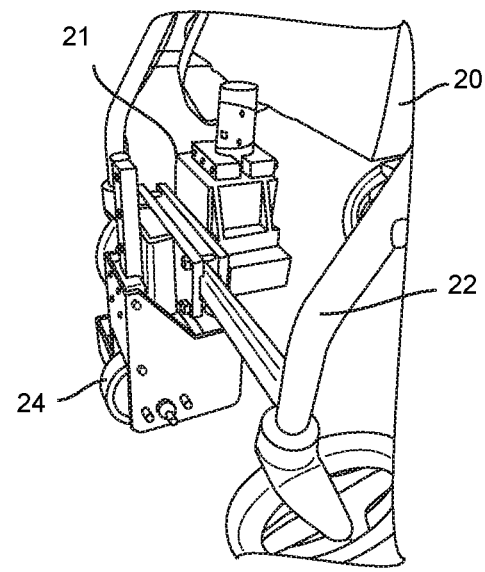
FIG. 3b is a perspective view of one embodiment of a device mounted on a conventional walker.
Figure 3C:
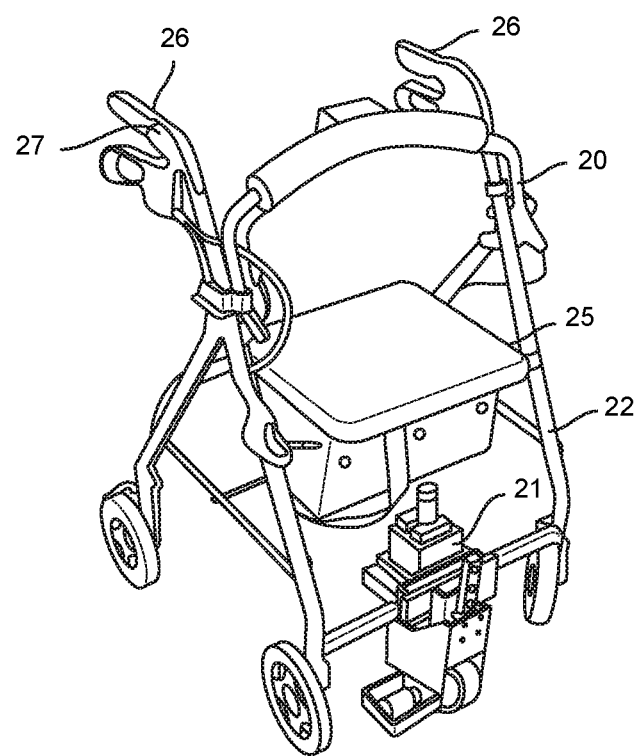
FIG. 3c is a perspective view of a conventional walker with a device in accordance with the invention disclosed herein mounted thereto.

In one embodiment, an adaptive device can be mounted on a standard walker in order to adapt a standard walker for use in accordance with this disclosure. As shown in FIGS. 3*a*, 3*b*, and 3*c*, such a device 21 is bolted or bracketed onto the frame 22 of a standard walker 20. It comprises of a housing 23 encasing a drive motor and a processor, a drive wheel 24, a proximity sensor which can be mounted under the seat 25 or on the seat back and which is coupled to the processor, and an energy source such as a battery. Force sensors 26 which can be mounted on the handles 27 of the walker 20 may also be included. These force sensors are coupled with the processor as well. A button can be mounted on the walker handle or in another convenient location. The button can be used to activate or deactivate the system.

By way of illustration and not of limitation, the processor uses input from the sensor to calculate the distance between the sensor and the user. The processor records the amount of time between the emission of a trigger pulse of light or ultrasound and the receipt of the echo pulse. By using the speed of light or sound in air, the distance is calculated by the processor using this time delay. The measurement and calculation is repeated, for example every few seconds, and the difference between calculations over time may be used to determine the rate of travel of the user. Values that are lower than or higher than certain minimum and maximum thresholds may disregarded. The processor uses logic to calculate an appropriate motor speed to match the speed of the drive wheel and maintain a distance between the user and the walker that meets preset parameters. The processor may additionally or alternatively calculate a motor speed which will match the speed of the walker to the speed of the user. If the user performs a precipitating act, such as falling too far behind or grabbing one or more handles and thus activating the pressure sensors, the processor will cause the drive wheel to be locked, immobilizing the walker. Alternatively or additionally, the brakes of the walker may be activated, immobilizing some or all walker wheels.

In still other embodiments, the components disclosed herein may be integrated with a mobility device.

In some embodiments, the proximity sensor may comprise a cord which connects the user and the walker and determines the proximity of the user through connection or disconnection of the cord or through tension of the cord.

Braking systems can include disc brakes, caliper brakes, clamping breaks, or a locking gear in the drive mechanism.

The mechanisms for triggering the brakes may include the force sensors on the walker's handles as discussed above, in addition to data derived from the proximity sensor indicating that a user is too far away from or too close to the sensor. Resistance measurements of the conductive frame/handles or strain measurements of the frame of the device may also be used.

Drive mechanisms may include a DC motor or DC gearmotor.

Mechanisms to allow motorized motion can include retractable drive wheels, or engagement of the motor with the shaft or axle of any wheel.

Motor controllers that could be used include a transistor controlled by PWM from the microcontroller.

In some embodiments, the electronic system uses PID control combined with a series of thresholds in order to stay within a certain distance range from the user. The range and preferred distance from the device can be adjusted based on the user's needs. The signals from the proximity sensor are filtered using a type of band-pass filter or outlier rejection. The signals could also be averaged over time before being sent to the PID control algorithm for analysis. The microprocessor checks both the mechanisms for triggering the brakes and the user interface on a regular basis while the present device is being used for autonomous motion. If the brakes have been triggered, then the microprocessor engages the braking system and waits for a period of time before releasing the brakes. If the user interface has turned off the autonomous motion feature, then the mechanism to allow motorized motion is disengaged.

The present invention allows a user to walk without any supporting mechanism or external support while a walker automatically moves with the user in response to the user's movement but without physical contact with the user. The walker stays close in order to supply support if needed by the user. The advantages of the present invention include, without limitation, an improved confidence in independent motion by the user, a faster and more effective transition between requiring a walking aid and fully independent motion, a gradual decrease in dependency on walking aids, and ambulatory rehabilitation within or outside of a professional physical therapy setting.

We claim the following:

1. A mobility aid comprising:
   a. a frame, at least one handle, a motor, and a plurality of wheels;
   b. a proximity sensor to generate data indicative of the proximity of said mobility aid to a user;
   c. circuitry coupled with said proximity sensor to determine whether said data generated by said proximity sensor indicates that said mobility aid is within a given distance from a user of said mobility aid;
   d. a force sensor coupled with said at least one handle to determine whether said user is in physical contact with said at least one handle; and
   e. circuitry coupled with said force sensor and at least one of said plurality of wheels, wherein said circuitry immobilizes said wheel when said user is in physical contact with said at least one handle; and
   f. said circuitry coupled with said proximity sensor is also coupled with said motor, said motor is coupled with at least one of said plurality of wheels, and said circuitry causes said motor to alter the movement of said wheel in response to data from said proximity sensor such that said mobility aid is adapted to move in order to maintain a position proximate to said user when said user is in motion and is not in physical contact with said mobility aid.

2. The mobility aid of claim 1 wherein said proximity sensor is affixed to said frame.

3. The mobility aid of claim 1 wherein said circuitry coupled with said proximity sensor is also coupled with said motor, said motor is coupled with at least one of said plurality of wheels, and said circuitry causes said motor to alter the movement of said wheel in response to data from said sensor.

4. The mobility aid of claim 1 wherein said proximity sensor emits infrared light.

5. The mobility aid of claim 1 wherein said proximity sensor emits ultrasound.

6. The mobility aid of claim 1 wherein said circuitry coupled with said force sensor releases said wheel when said user is not in physical contact with said at least one handle.

7. A method of using a mobility aid to assist in walking, comprising:
   a. providing a mobility aid, said mobility aid comprising a frame, at least one handle, and a plurality of wheels; said mobility aid further comprising a proximity sensor to generate data indicative of the proximity of said mobility aid to a user and circuitry coupled with said proximity sensor to determine whether said data generated by said proximity sensor indicates that said mobility aid is within a specified distance from a user of said mobility aid, said mobility aid further comprising a motor coupled with at least one of said plurality of wheels, said motor coupled with said circuitry; and b. walking without physically contacting said mobility aid, wherein said circuitry causes said motor to move said mobility aid in such a manner so as to maintain a position proximate to said user when said user is not in physical contact with said mobility aid, specified distance between said user and said mobility aid.

8. The method of claim 7 wherein said mobility aid further comprises a force sensor coupled with said at least one handle to determine whether said user is in physical contact with said at least one handle, and circuitry coupled with said force sensor and at least one of said plurality of wheels, wherein said circuitry immobilizes said wheel when said user is in physical contact with said at least one handle.

9. The method of claim 8 wherein said circuitry coupled with said force sensor releases said wheel when said user is not in physical contact with said at least one handle.

10. The method of claim 7 wherein said proximity sensor is affixed to said frame.

11. The method of claim 7 wherein said sensor emits infrared light.

12. The method of claim 7 wherein said sensor emits ultrasound.

* * * * *